US011203331B2

(12) United States Patent
Kato et al.

(10) Patent No.: US 11,203,331 B2
(45) Date of Patent: Dec. 21, 2021

(54) VEHICLE BRAKING DEVICE

(71) Applicant: ADVICS CO., LTD., Kariya (JP)

(72) Inventors: Osayoshi Kato, Nagoya (JP); Hiroyuki Ando, Nagoya (JP); Takahiro Yamaguchi, Kariya (JP); Yoshio Masuda, Anjo (JP)

(73) Assignee: ADVICS CO., LTD., Kariya (JP)

( * ) Notice: Subject to any disclaimer, the term of this patent is extended or adjusted under 35 U.S.C. 154(b) by 267 days.

(21) Appl. No.: 16/472,026

(22) PCT Filed: Dec. 21, 2017

(86) PCT No.: PCT/JP2017/046004
§ 371 (c)(1),
(2) Date: Jun. 20, 2019

(87) PCT Pub. No.: WO2018/117236
PCT Pub. Date: Jun. 28, 2018

(65) Prior Publication Data
US 2020/0094802 A1    Mar. 26, 2020

(30) Foreign Application Priority Data

Dec. 21, 2016  (JP) .............................. JP2016-248200
Mar. 31, 2017  (JP) .............................. JP2017-069959

(51) Int. Cl.
*B60T 13/16*    (2006.01)
*B60T 13/58*    (2006.01)
(Continued)

(52) U.S. Cl.
CPC .............. *B60T 13/167* (2013.01); *B60T 8/17* (2013.01); *B60T 13/58* (2013.01); *B60T 13/686* (2013.01);
(Continued)

(58) Field of Classification Search
CPC . B60T 8/26; B60T 11/34; B60T 8/265; B60T 8/94; B60T 13/686; B60T 17/221;
(Continued)

(56) References Cited

U.S. PATENT DOCUMENTS 5,167,441 A * 12/1992 Schonlau .................. B60T 8/26
188/349
5,180,211 A *  1/1993 Weise ....................... B60T 8/26
303/113.5
(Continued)

FOREIGN PATENT DOCUMENTS

| EP | 1894801 A2 * | 3/2008 | ............ B60T 8/4072 |
| JP | 2001180469 A | 7/2001 | |
| JP | 2003137085 A | 5/2003 | |

OTHER PUBLICATIONS

International Search Report (PCT/ISA/210) dated Apr. 3, 2018, by the Japanese Patent Office as the International Searching Authority for International Application No. PCT/JP2017/046004.
(Continued)

*Primary Examiner* — Robert A. Siconolfi
*Assistant Examiner* — Mahbubur Rashid
(74) *Attorney, Agent, or Firm* — Buchanan Ingersoll & Rooney PC

(57) ABSTRACT

A hydraulic circuit comprises: a first pressure-boosting flow path that connects a first main flow path and a first wheel cylinder; a first pressure-boosting valve that is disposed in the first pressure-boosting flow path and that opens in a non-energized state; a first pressure-reducing flow path that connects the first wheel cylinder and a reservoir; a first pressure-reducing valve that is disposed in the first pressure-reducing flow path and that closes in a non-energized state; a second pressure-boosting flow path; a second pressure-boosting valve; a second pressure-reducing flow path; and a second pressure-reducing valve. A control unit comprises: a
(Continued)

first drive circuit that controls the first pressure-reducing valve; and a second drive circuit that is separate from the first drive circuit and that controls the second pressure-reducing valve.

12 Claims, 8 Drawing Sheets

(51) Int. Cl.
  *B60T 17/22* (2006.01)
  *B60T 13/68* (2006.01)
  *B60T 8/17* (2006.01)
  *B60T 8/94* (2006.01)

(52) U.S. Cl.
  CPC ............... *B60T 17/221* (2013.01); *B60T 8/94* (2013.01); *B60T 2270/402* (2013.01); *B60T 2270/413* (2013.01)

(58) Field of Classification Search
  CPC ........ B60T 17/22; B60T 8/1831; B60T 8/306; B60T 11/101; B60T 11/323; B60T 13/141; B60T 13/148; B60T 8/341; B60T 13/66; B60T 17/04; B60T 17/06; B60T 17/225; B60T 8/346; B60T 8/347; B60T 8/348
  See application file for complete search history.

(56) References Cited

U.S. PATENT DOCUMENTS

| | | | | |
|---|---|---|---|---|
| 6,206,484 | B1 * | 3/2001 | Ganzel | B60T 8/268 |
| | | | | 188/358 |
| 7,413,265 | B2 * | 8/2008 | Tione | B60T 8/885 |
| | | | | 303/122.04 |
| 8,672,419 | B2 * | 3/2014 | Miyazaki | B60T 8/885 |
| | | | | 303/113.4 |
| 8,894,159 | B2 * | 11/2014 | Nakata | B60T 8/4081 |
| | | | | 303/122.09 |
| 9,221,443 | B2 * | 12/2015 | Ganzel | B60T 8/4072 |
| 2001/0006305 | A1 | 7/2001 | Nakamura et al. | |
| 2008/0048491 | A1 * | 2/2008 | Matsubara | B60T 17/22 |
| | | | | 303/14 |
| 2012/0126610 | A1 * | 5/2012 | Nakata | B60T 8/4081 |
| | | | | 303/9.63 |
| 2016/0325719 | A1 * | 11/2016 | Linhoff | B60T 8/92 |
| 2016/0339885 | A1 * | 11/2016 | Linhoff | B60T 17/18 |

OTHER PUBLICATIONS

Written Opinion (PCT/ISA/237) dated Apr. 3, 2018, by the Japanese Patent Office as the International Searching Authority for International Application No. PCT/JP2017/046004.

* cited by examiner

VEHICLE BRAKING DEVICE

TECHNICAL FIELD

The present invention relates to a vehicle braking device.

BACKGROUND ART

The vehicle braking device includes a plurality of electromagnetic valves to adjust the hydraulic pressure of a wheel cylinder. For example, in the vehicle braking device described in Japanese Unexamined Patent Publication No. 2001-180469, signal lines connecting the plurality of electromagnetic valves and a brake ECU are divided into two signal line groups, and independent connectors are used for each of the signal line groups to enhance the reliability of the device. According to such a configuration, even when a problem occurs in one of the connectors, the electromagnetic valve (electromagnetic valve corresponding to a pair of wheels at diagonal positions) connected to the other connector can be controlled. Furthermore, the publication discloses a technology in which power supply lines of two power supply devices are connected to each electromagnetic valve, and each electromagnetic valve is controlled with the two power supply systems.

CITATIONS LIST

Patent Literature

Patent Literature 1: Japanese Unexamined Patent Publication No. 2001-180469

SUMMARY OF INVENTION

Technical Problems

However, in the configuration described above, the coil of the power supply device having a power supply line or the electromagnetic valve needs to be held redundantly, that is, doubly so that the hydraulic pressure control can be continued even when a problem arises in one power supply device. Thus, the number of parts increases, which causes problems such as increase in size and increase in cost.

In light of the foregoing, an object of the present invention is to provide a vehicle braking device capable of improving failsafe performance at the time of abnormality while suppressing an increase in the number of parts.

Solutions to Problems

A vehicle braking device according to the present invention includes a pressurization source that ejects a brake fluid to a first main flow path; a reservoir that stores the brake fluid; a hydraulic circuit connected to the first main flow path; and a control unit that controls the hydraulic circuit; where the hydraulic circuit includes a first pressure-boosting flow path that connects the first main flow path and a first wheel cylinder, a first pressure-boosting valve that is disposed in the first pressure-boosting flow path and that opens in a non-energized state, a first pressure-reducing flow path that connects the first wheel cylinder and the reservoir, a first pressure-reducing valve that is disposed in the first pressure-reducing flow path and that closes in a non-energized state, a second pressure-boosting flow path that connects the first main flow path and a second wheel cylinder, a second pressure-boosting valve that is disposed in the second pressure-boosting flow path and that opens in a non-energized state, a second pressure-reducing flow path that connects the second wheel cylinder and the reservoir, and a second pressure-reducing valve that is disposed in the second pressure-reducing flow path and that closes in a non-energized state; and the control unit includes a first drive circuit that controls the first pressure-reducing valve, and a second drive circuit that is a separate drive circuit from the first drive circuit and that controls the second pressure-reducing valve.

Advantageous Effects of Invention

According to the present invention, even when an abnormality occurs in one of the first drive circuit and the second drive circuit, the first pressure-boosting valve and the second pressure-boosting valve, which are normally open type, are maintained in the open state. Thus, when the boosting the hydraulic pressure (wheel pressure) of the wheel cylinder, the brake fluid is supplied from the pressurization source to the first wheel cylinder through the first main flow path and the first pressure-boosting flow path, and the brake fluid is supplied from the pressurization source to the second wheel cylinder through the first main flow path and the second pressure-boosting flow path. That is, the wheel pressure can be pressurized similar to the normal time. Furthermore, when reducing the wheel pressure, the normal first drive circuit or second drive circuit can open the corresponding first pressure-reducing valve or second pressure-reducing valve.

When the first pressure-reducing valve is opened, the brake fluid in the first wheel cylinder flows out to the reservoir through the first pressure-reducing flow path, and the brake fluid in the second wheel cylinder flows out to the reservoir through the second pressure-boosting flow path, the first main flow, the first pressure-boosting flow path, and the first pressure-reducing flow path. Similarly, when the second pressure-reducing valve is opened, the brake fluid in the first wheel cylinder flows out to the reservoir through the first pressure-boosting flow path, the first main flow path, the second pressure-boosting flow path, and the second pressure-reducing flow path, and the brake fluid in the second wheel cylinder flows out to the reservoir through the second pressure-reducing flow path. Thus, even when one of the drive circuits malfunctions, the wheel pressure can be boosted or reduced and the failsafe performance is improved. Furthermore, according to the present invention, when performing the configuration of realizing the operation described above, doubling of the coils of the power supply device and the electromagnetic valve is unnecessary, and the drive circuit merely needs to be added. That is, according to the present invention, the failsafe performance at the time of abnormality can be improved while suppressing an increase in the number of parts.

DESCRIPTION OF EMBODIMENTS

Figure 1:
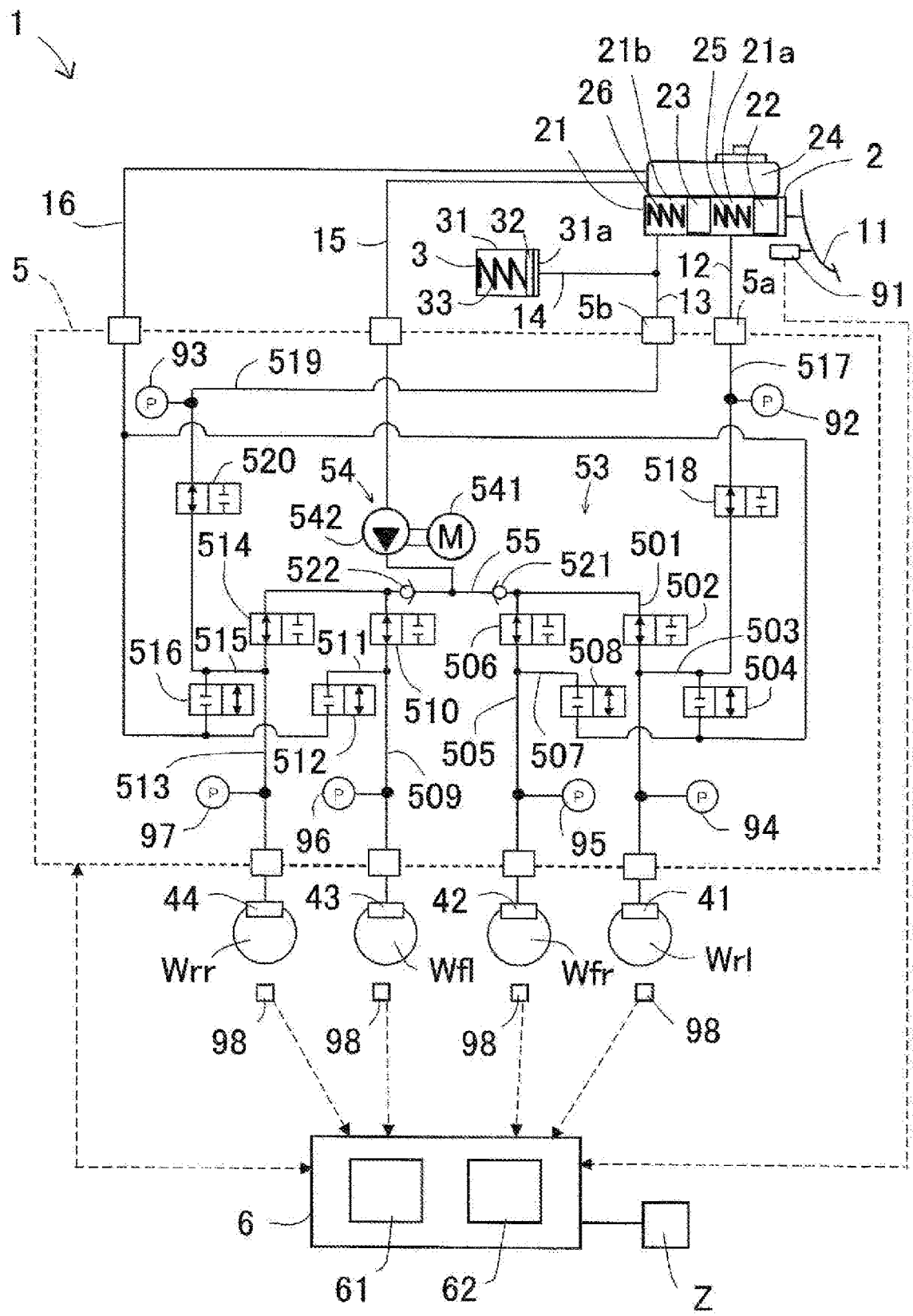
FIG. 1 is a configuration view showing a configuration of a vehicle braking device according to a first embodiment.

Hereinafter, an example of the present invention will be described based on the drawings. Each figure used for the description is a conceptual view, and the shape of each portion is not necessarily exact in some cases. As shown in FIG. 1, a vehicle braking device 1 according to a first embodiment includes a brake operation member 11, a cylinder mechanism 2, a stroke simulator 3, wheel cylinders 41, 42, 43 and 44, an actuator 5, and a brake ECU (corresponds to "control unit") 6.

The brake operation member 11 is a member for transmitting a brake operation to the cylinder mechanism 2 and is a brake pedal. A stroke sensor 91 for detecting a stroke (operation amount) is installed on the brake operation member 11. The stroke sensor 91 transmits the detection result to the brake ECU 6.

The cylinder mechanism 2 includes a master cylinder 21, a first master piston 22, a second master piston 23, a reservoir 24, and springs 25 and 26. The master cylinder 21 is a bottomed tubular cylinder member. The brake operation member 11 is disposed on an opening side of the master cylinder 21. The master cylinder 21 is a member in which the hydraulic pressure (master pressure) increases and decreases according to the operation of the brake operation member 11. Hereinafter, for the sake of description, the bottom surface side of the master cylinder 21 is referred to as the front side, and the opening side is referred to as the rear side.

The first and second master pistons 22 and 23 are slidably disposed in the master cylinder 21. The second master piston 23 is disposed on the front side of the first master piston 22. The first master piston 22 is biased toward the rear side by a spring 25. The second master piston 23 is biased toward the rear side by a spring 26. The first and second master pistons 22 and 23 partition the inside of the master cylinder 21 into a first master chamber 21a and a second master chamber 21b. The first master chamber 21a is formed by the first and second master pistons 22 and 23 and the master cylinder 21, and the second master chamber 21b is formed by the second master piston 23 and the master cylinder 21. The first master chamber 21a is connected to a port 5a of the actuator 5 through a flow path 12 (a part of first master flow path 517 to be described later). The second master chamber 21b is connected to a port 5b of the actuator 5 through a flow path 13 (a part of second master flow path 519 to be described later).

The reservoir 24 is a reservoir tank for storing the brake fluid, and is connected to the master cylinder 21 so as to be configured to communicate with the first master chamber 21a and the second master chamber 21b. The pressure of the reservoir 24 is atmospheric pressure. The reservoir 24 and each of the master chambers 21a and 21b are communicated/blocked according to the movement of the first and second master pistons 22 and 23. When the first and second master pistons 22 and 23 are located at the initial position, the reservoir 24 and the master chambers 21a and 21b communicate with each other, and the reservoir 24 and the master chambers 21a, 21b are blocked by the movement (forward movement) of the first and second master pistons 22 and 23. Hereinafter, the hydraulic pressure of each of the master chambers 21a and 21b is referred to as a master pressure.

The stroke simulator 3 is a device that generates a reaction force with respect to the operation of the brake operation member 11. The stroke simulator 3 is connected to the flow path 13 through a flow path 14. The stroke simulator 3 includes a cylinder member 31, a piston member 32 and a spring 33. A reaction force chamber 31a partitioned by the piston member 32 is formed at an end portion on the flow path 14 side of the cylinder member 31.

The wheel cylinders 41 to 44 are members provided on the wheels Wrl, Wfr, Wfl, Wrr (hereinafter collectively referred to as the wheels W) of the vehicle to apply a braking force corresponding to the hydraulic pressure (wheel pressure) to the wheels W. For example, although not shown, a brake pad is pressed according to the increase of the wheel pressure and abuts against a disc rotor to exert the braking force. A wheel cylinder 41 (corresponds to "first wheel cylinder") is provided on the left rear wheel Wrl. A wheel cylinder 42 (corresponds to "second wheel cylinder") is provided on the right front wheel Wfr. A wheel cylinder 43 (corresponds to "third wheel cylinder") is provided on the left front wheel Wfl. A wheel cylinder 44 (corresponds to "fourth wheel cylinder") is provided on the right rear wheel Wrr. In the first embodiment, so-called X piping is adopted. Each wheel W is provided with a wheel speed sensor 98. The wheel speed sensor 98 transmits the detection result to the brake ECU 6.

The actuator 5 is a device that adjusts the hydraulic pressure of the brake fluid to supply to the wheel cylinders 41 to 44. The actuator 5 includes a pressurization source 54, a main flow path (corresponds to "first main flow path" and "second main flow path") 55, and a hydraulic circuit 53. The pressurization source 54 is a device that discharges the brake fluid to the main flow path 55. Specifically, the pressurization source 54 includes an electric motor 541 and a pump (corresponds to "pressurization device") 542. The electric motor 541 drives the pump 542 based on a command of the brake ECU 6. The pump 542 is an electric pump which discharge port is connected to the main flow path 55 and suction port is connected to the reservoir 24 through a flow path 15. The pump 542 is driven by the electric motor 541 and discharges the brake fluid suctioned from the reservoir 24 to the main flow path 55. The main flow path 55 is a flow path connecting the discharge port of the pump 542 and the pressure-boosting flow paths 501, 505, 509, and 513, to be described later.

The hydraulic circuit 53 includes a first pressure-boosting flow path 501, a first pressure-boosting valve 502, a first pressure-reducing flow path 503, a first pressure-reducing valve 504, a second pressure-boosting flow path 505, a second pressure-boosting valve 506, a second pressure-reducing flow path 507, a second pressure-reducing valve 508, a third pressure-boosting flow path 509, a third pressure-boosting valve 510, a third pressure-reducing flow path 511, a third pressure-reducing valve 512, a fourth pressure-boosting flow path 513, a fourth pressure-boosting valve 514, a fourth pressure-reducing flow path 515, a fourth pressure-reducing valve 516, a first master flow path 517, a first control valve 518, a second master flow path 519, and a second control valve 520. That is, the hydraulic circuit 53 includes four channels configured by the pressure-boosting flow path, the pressure-boosting valve, the pressure-reducing flow path, and the pressure-reducing valve.

The first pressure-boosting flow path 501 is a flow path connecting the main flow path 55 and the wheel cylinder 41. The first pressure-boosting valve 502 is a normally open type electromagnetic valve disposed in the first pressure-boosting flow path 501 and opened in a non-energized state. The state of the first pressure-boosting flow path 501 is switched between communication and blocking by the opening and closing of the first pressure-boosting valve 502. The first pressure-reducing flow path 503 is a flow path connecting the wheel cylinder 41 and the reservoir 24. In detail, the first pressure-reducing flow path 503 is a flow path connecting the portion of the first pressure-boosting flow path 501 between the first pressure-boosting valve 502 and the wheel cylinder 41 side end portion and the reservoir 24. The first pressure-reducing valve 504 is a normally closed type electromagnetic valve that is disposed in the first pressure-reducing flow path 503 and closed in a non-energized state. The state of the first pressure-reducing flow path 503 is switched between communication and blocking by the opening and closing of the first pressure-reducing valve 504. The other channels also have the same configuration and will be briefly described below.

The second pressure-boosting flow path 505 is a flow path connecting the main flow path 55 and the wheel cylinder 42. The second pressure-boosting valve 506 is a normally open type electromagnetic valve disposed in the second pressure-boosting flow path 505 and opened in a non-energized state. The second pressure-reducing flow path 507 is a flow path connecting the wheel cylinder 42 and the reservoir 24. In detail, the second pressure-reducing flow path 507 is a flow path connecting the portion of the second pressure-boosting flow path 505 between the second pressure-boosting valve 506 and the wheel cylinder 42 side end portion and the reservoir 24. The second pressure-reducing valve 508 is a normally closed type electromagnetic valve that is disposed in the second pressure-reducing flow path 507 and closed in a non-energized state.

The third pressure-boosting flow path 509 is a flow path connecting the main flow path 55 and the wheel cylinder 43. The third pressure-boosting valve 510 is a normally open type electromagnetic valve disposed in the third pressure-boosting flow path 509 and opened in a non-energized state. The third pressure-reducing flow path 511 is a flow path connecting the wheel cylinder 43 and the reservoir 24. In detail, the third pressure-reducing flow path 511 is a flow path connecting the portion of the third pressure-boosting flow path 509 between the third pressure-boosting valve 510 and the wheel cylinder 43 side end portion and the reservoir 24. The third pressure-reducing valve 512 is a normally closed type electromagnetic valve that is disposed in the third pressure-reducing flow path 511 and closed in a non-energized state.

The fourth pressure-boosting flow path 513 is a flow path connecting the main flow path 55 and the wheel cylinder 44. The fourth pressure-boosting valve 514 is a normally open type electromagnetic valve disposed in the fourth pressure-boosting flow path 513 and opened in a non-energized state. The fourth pressure-reducing flow path 515 is a flow path connecting the wheel cylinder 44 and the reservoir 24. In detail, the fourth pressure-reducing flow path 515 is a flow path connecting the portion of the fourth pressure-boosting flow path 513 between the fourth pressure-boosting valve 514 and the wheel cylinder 44 side end portion and the reservoir 24. The fourth pressure-reducing valve 516 is a normally closed type electromagnetic valve that is disposed in the fourth pressure-reducing flow path 515 and closes in a non-energized state. Each pressure-reducing flow path 503, 507, 511, 515 merges to one in the path on the reservoir 24 side than the corresponding pressure-reducing valve 504, 508, 512, 516 to become one flow path 16, and then connected to the reservoir 24.

The first master flow path 517 is a flow path connecting the wheel cylinder 41 and the master cylinder 21. In detail, the first master flow path 517 is a flow path connecting the portion of the first pressure-boosting flow path 501 between the first pressure-boosting valve 502 and the wheel cylinder 41 side end portion or the portion on the first pressure-boosting flow path 501 side than the first pressure-reducing valve 504 of the first pressure-reducing flow path 503, and the master cylinder 21. In the first embodiment, the first master flow path 517 connects the portion on the first pressure-boosting flow path 501 side than the first pressure-reducing valve 504 of the first pressure-reducing flow path 503 and the first master chamber 21*a*. The first control valve 518 is a normally open type electromagnetic valve disposed in the first master flow path 517 and opened in a non-energized state.

The second master flow path 519 is a flow path connecting the wheel cylinder 44 and the master cylinder 21. In detail, the second master flow path 519 is a flow path connecting the portion of the fourth pressure-boosting flow path 513 between the fourth pressure-boosting valve 514 and the wheel cylinder 44 side end portion or the portion on the fourth pressure-boosting flow path 513 side than the fourth pressure-reducing valve 516 of the fourth pressure-reducing flow path 515, and the master cylinder 21. In the first embodiment, the second master flow path 519 connects the portion on the fourth pressure-boosting flow path 513 side than the fourth pressure-reducing valve 516 in the fourth pressure-reducing flow path 515 and the second master chamber 21*b*. The second control valve 520 is a normally open type electromagnetic valve disposed in the second master flow path 519 and opened in a non-energized state. Each control valve 518, 520 can also be said as a master cut valve.

Furthermore, in the main flow path 55, a first check valve 521 and a second check valve 522 are provided. The first check valve 521 permits the flow of a brake fluid from the pump 542, the third pressure-boosting valve 510, and the fourth pressure-boosting valve 514 side (with respect to itself) to the first pressure-boosting valve 502 and the second pressure-boosting valve 506 side, and prohibits the flow of a brake fluid from the first pressure-boosting valve 502 and the second pressure-boosting valve 506 side to the pump 542, the third pressure-boosting valve 510, and the fourth pressure-boosting valve 514 side. The second check valve 522 permits the flow of a brake fluid from the pump 542, the first pressure-boosting valve 502, and the second pressure-boosting valve 506 side (with respect to itself) to the third pressure-boosting valve 510 and the fourth pressure-boosting valve 514 side, and prohibits the flow of a brake fluid from the third pressure-boosting valve 510 and the fourth pressure-boosting valve 514 side to the pump 542, the first pressure-boosting valve 502, and the second pressure-boosting valve 506 side.

The actuator 5 also includes pressure sensors 92-97. The pressure sensor 92 is connected to a portion on the master cylinder 21 side than the first control valve 518 of the first master flow path 517. The pressure sensor 93 is connected to a portion on the master cylinder 21 side than the second control valve 520 of the second master flow path 519. The pressure sensor 94 is connected to a portion on the wheel cylinder 41 side than the first pressure-boosting valve 502 of the first pressure-boosting flow path 501 so as to detect the hydraulic pressure of the wheel cylinder 41. Similarly, the pressure sensor 95 is connected to the second pressure-boosting flow path 505, the pressure sensor 96 is connected to the third pressure-boosting flow path 509, and the pressure sensor 97 is connected to the fourth pressure-boosting flow path 513. The pressure sensors 92 to 97 transmit the detection results to the brake ECU 6.

The brake ECU 6 is an electronic control unit including a CPU, a memory, and the like, and is a device that controls the actuator 5. The brake ECU 6 is connected to a power supply (battery) Z. The brake ECU 6 receives detection results from the various sensors 91 to 98, and controls the actuator 5 based on the detection results. That is, the brake ECU 6 applies a control current to each electromagnetic valve and the electric motor 541 according to the detection result.

For example, when the brake operation member 11 is operated (when stroke is detected), the brake ECU 6 applies a control current to the first control valve 518, the second control valve 520, and the electric motor 541. That is, in this case, the brake ECU 6 closes the first and second control valves 518 and 520, and drives the pump 542 according to the stroke. As a result, the brake fluid is supplied from the pump 542 to each of the wheel cylinders 41 to 44 through each of the pressure-boosting flow paths 501, 505, 509, and 513. That is, the wheel pressure is boosted. On the other hand, when the brake operation is released, the brake ECU 6 applies a control current to each of the pressure-reducing valves 504, 508, 512, 516 to open each of the pressure-reducing valves 504, 508, 512, 516. Thus, the brake fluid in the wheel cylinders 41 to 44 flows out to the reservoir 24, and the wheel pressure decreases.

Figure 2:
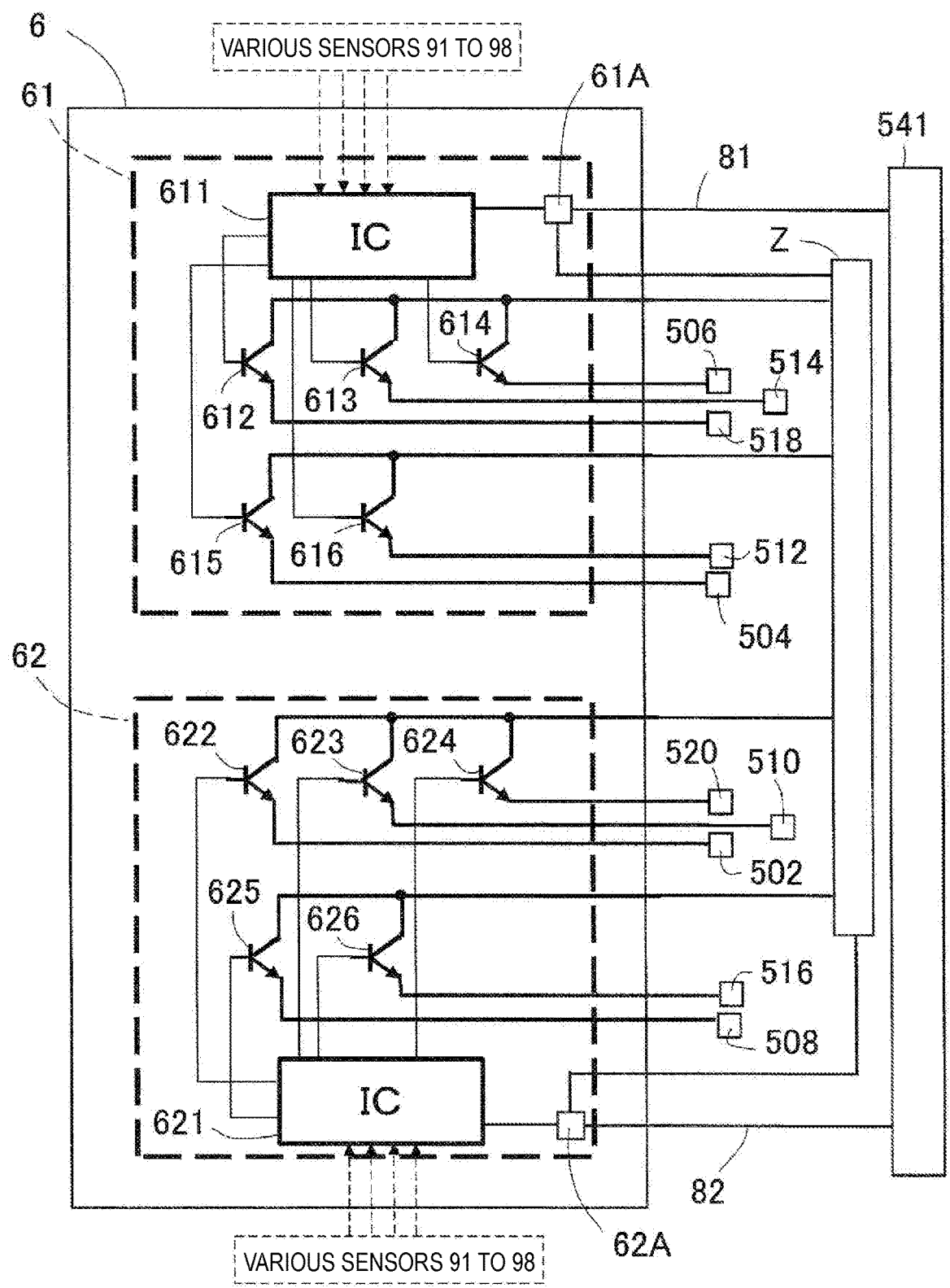
FIG. 2 is a configuration view showing a brake ECU according to the first embodiment.
Figure 3:
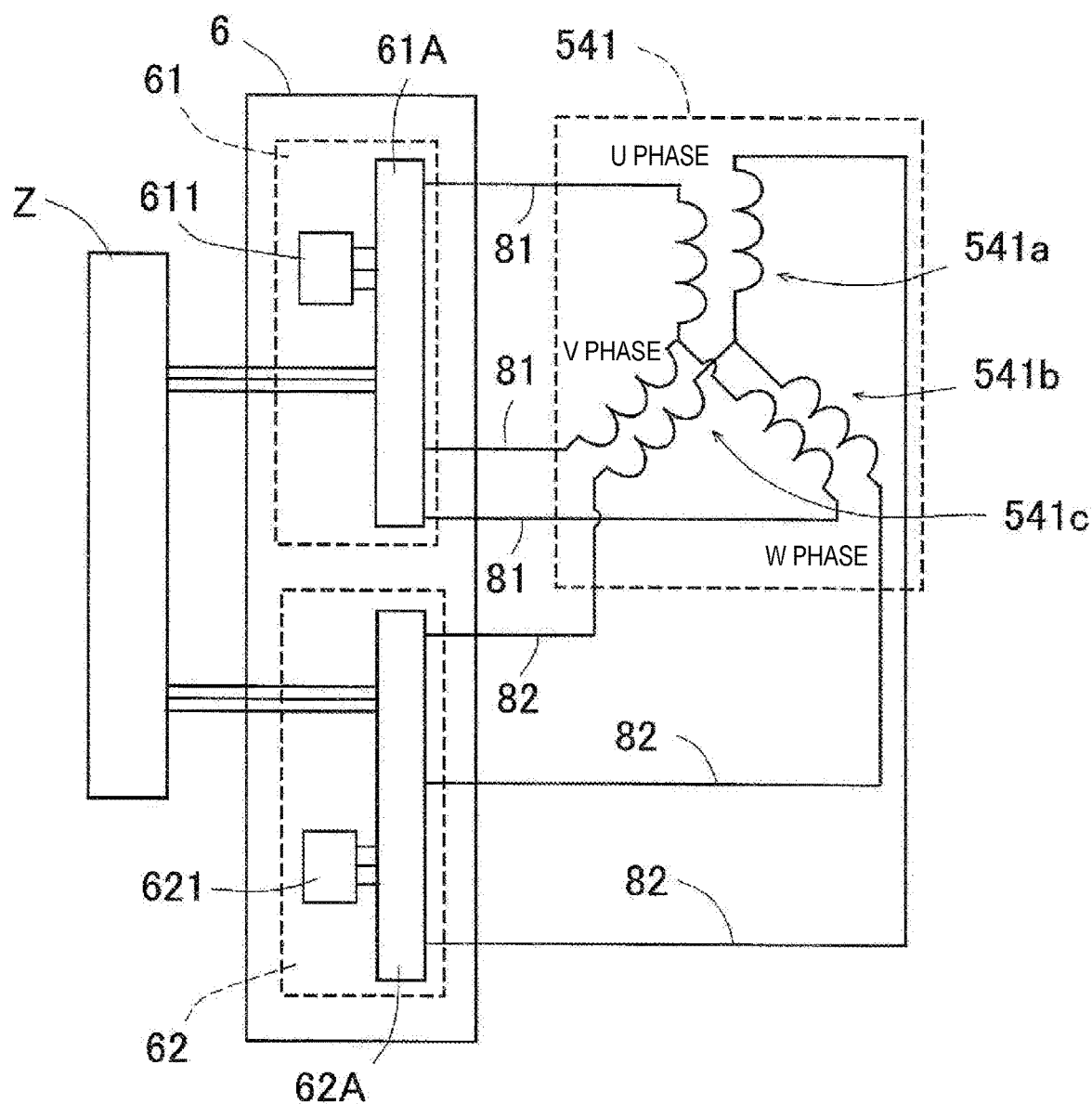
FIG. 3 is a configuration view showing a brake ECU according to the first embodiment.

The brake ECU 6 of the first embodiment has two independent drive circuits. That is, as shown in FIGS. 1 to 3, the brake ECU 6 includes the first drive circuit 61 and a second drive circuit 62 which is a drive circuit separate from the first drive circuit 61. The first drive circuit 61 is a drive circuit that controls the first pressure-reducing valve 504, the second pressure-boosting valve 506, the third pressure-reducing valve 512, the fourth pressure-boosting valve 514, the first control valve 518, and the electric motor 541. On the other hand, the second drive circuit 62 is a drive circuit that controls the first pressure-boosting valve 502, the second pressure-reducing valve 508, the third pressure-boosting valve 510, the fourth pressure-reducing valve 516, the second control valve 520, and the electric motor 541.

As shown in FIG. 2, the first drive circuit 61 includes an IC chip 611, switching elements 612 to 616, and a switching element group 61A having a plurality of switching elements for controlling the electric motor 541. The IC chip 611 is an integrated circuit, and controls ON/OFF of the switching elements 612 to 616 and the switching elements of the switching element group 61A (hereinafter collectively referred to as "switching elements 612 to 616, 61A") based on the detection results received from the various sensors 91 to 98. In addition, in FIG. 2, in the intersecting circuit, a black circle is attached when connected, and a black circle is not attached when not connected.

The switching elements 612 to 616, 61A are, for example, field effect transistors. Gate terminals (control terminals) of the switching elements 612 to 616 and 61A are connected to the IC chip 611. Source terminals of the switching elements 612 to 616 and 61A are connected to the power supply Z. The drain terminal of the switching element 612 is connected to the first control valve 518. The drain terminal of the switching element 613 is connected to the fourth pressure-boosting valve 514. The drain terminal of the switching element 614 is connected to the second pressure-boosting valve 506. The drain terminal of the switching element 615 is connected to the first pressure-reducing valve 504. The drain terminal of the switching element 616 is connected to the third pressure-reducing valve 512. The drain terminal of each switching element of the switching element group 61A is connected to the electric motor 541. The IC chip 611 energizes the connection destination of the drain terminal by turning on the switching elements 612 to 626 and 61A.

The second drive circuit 62 includes an IC chip 621, switching elements 622 to 626, and a plurality of switching element groups 62A for the electric motor 541. The IC chip 621 is an integrated circuit, and controls ON/OFF of the switching elements 622 to 626 and the switching elements of the switching element group 62A (hereinafter collectively referred to as "switching elements 622 to 626, 62A") based on the detection results received from the various sensors 91 to 98.

The switching elements 622 to 626 and 62A are, for example, field effect transistors. Gate terminals of the switching elements 622 to 626 and 62A are connected to the IC chip 621. Source terminals of the switching elements 622 to 626 and 62A are connected to the power supply Z. The drain terminal of the switching element 622 is connected to the first pressure-boosting valve 502. The drain terminal of the switching element 623 is connected to the third pressure-boosting valve 510. The drain terminal of the switching element 624 is connected to the second control valve 520. The drain terminal of the switching element 625 is connected to the second pressure-reducing valve 508. The drain terminal of the switching element 626 is connected to the fourth pressure-reducing valve 516. The drain terminal of each switching element of the switching element group 62A is connected to the electric motor 541. The IC chip 621 supplies power to the device connected to the drain terminal by turning on the switching elements 622 to 626 and 62A.

In the example of the first embodiment, a brushless DC motor is adopted as the electric motor 541. The switching element groups 61A and 62A are each configured by, for example, six switching elements in correspondence with the configuration of the electric motor 541. As shown in FIG. 3, the stator of the electric motor 541 includes coils 541a, 541b, 541c of three phases (U phase, V phase, W phase). A lead wire 81 connected to the drain terminal of each switching element of the switching element group 61A and a lead wire 82 connected to the drain terminal of each switching element of the switching element group 62A are wound to form each coil 541a to 541c. That is, each of the coils 541a to 541c is configured to function when at least one of the lead wires 81 and 82 is energized. The first drive circuit 61 and the second drive circuit 62 are connected to be independently controllable to each other with respect to the electric motor 541. In other words, the electric motor 541 is connected to the first drive circuit 61 and the second drive circuit 62 so as to be independently controllable by the first drive circuit 61 and the second drive circuit 62. In addition, in FIG. 3, control configuration other than on the electric motor 541 will be omitted. Furthermore, the electric motor 541 may be a motor other than a brushless DC motor.

Here, a case where the second drive circuit 62 is normal and an abnormality occurred in the first drive circuit 61 will be described. In this case, energization to the connection destination (control target) of the first drive circuit 61 is disabled, and the state of the connection destination is maintained in the non-energized state. Specifically, when the first drive circuit 61 is abnormal, regardless of the control state, the first control valve 518 is in the open state, the first pressure-reducing valve 504 is in the closed state, the second pressure-boosting valve 506 is in the open state, the third pressure-reducing valve 512 is in the closed state, the fourth pressure-boosting valve 514 is in the open state, and the lead wire 81 is in the non-energized state.

Even in this state, according to the first embodiment, the hydraulic pressure of the wheel cylinders 42 to 44 is controlled by the second drive circuit 62. First, the case where the brake operation is performed in this state will be described. In this case, the second drive circuit 62 closes the second control valve 520 and closes the first pressure-boosting valve 502. As a result, the wheel cylinder 41 and the first master chamber 21*a* are communicated independently from the pressurization source 54, and the brake feeling is maintained, and the hydraulic pressure (master pressure) corresponding to the stroke is applied to the wheel cylinder 41. As the brake feeling is maintained, the difference between the normal state and the abnormal state, which are compared in the same operation, becomes small with respect to the detection result (stroke) of the stroke sensor 91.

Furthermore, the second drive circuit 62 maintains the second pressure-reducing valve 508 and the fourth pressure-reducing valve 516 in the closed state, maintains the third pressure-boosting valve 510 in the open state, energizes the lead wire 82, and drives the electric motor 541. Thus, the pump 542 is driven, and the brake fluid is supplied from the main flow path 55 to the wheel cylinder 42 through the second pressure-boosting flow path 505, and then supplied to the wheel cylinder 43 through the third pressure-boosting flow path 509 and supplied to the wheel cylinder 44 through the fourth pressure-boosting flow path 513. That is, the hydraulic pressure of the wheel cylinders 42 to 44 is pressurized by the pressurization source 54. The second drive circuit 62 controls the electric motor 541 based on the stroke and the values of the pressure sensors 95 to 97. The brake fluid is supplied to the wheel cylinder 41 through the first master flow path 517 and the first pressure-boosting flow path 501, and the hydraulic pressure pressurized by the pressurization source 54 is generated in the wheel cylinders 42 to 44. Thus, normal braking force (braking force based on pressurization control) is exerted on the front wheels Wfr and Wfl and the right rear wheel Wrr, and braking force based on the master pressure is exerted on the left rear wheel Wrl.

On the other hand, when the brake operation is released from the braking state in a state where the first drive circuit 61 is abnormal, the second drive circuit 62 opens the second pressure-reducing valve 508 and the fourth pressure-reducing valve 516, opens the first control valve 518 and stops the energization to the electric motor 541. The pump 542 is thereby stopped, so that the brake fluid in the wheel cylinder 42 flows out to the reservoir 24 through the second pressure-reducing flow path 507, and the brake fluid in the wheel cylinder 44 flows out to the reservoir 24 through the fourth pressure-reducing flow path 515. In addition, the brake fluid in the wheel cylinder 41 flows out to the reservoir 24 through the first pressure-boosting flow path 501, the first pressure-reducing flow path 503, the first master flow path 517, and the first master chamber 21*a*. Furthermore, the brake fluid in the wheel cylinder 43 flows out to the reservoir 24 through the third pressure-boosting flow path 509, the fourth pressure-boosting flow path 513, and the fourth pressure-reducing flow path 515. The hydraulic pressure of the wheel cylinders 41 to 44 thus can be reduced. The wheel cylinder 41 and the reservoir 24 are also communicated through the first pressure-boosting flow path 501, the second pressure-boosting flow path 505, and the second pressure-reducing flow path 507.

Similarly, the case where the first drive circuit 61 is normal and the second drive circuit 62 is abnormal will be described. In this case, regardless of the control state, the second control valve 520 is opened, the first pressure-boosting valve 502 is opened, the second pressure-reducing valve 508 is closed, the third pressure-boosting valve 510 is open, the fourth pressure-reducing valve 516 is closed, and the lead wire 82 is in the non-energized state. When the brake operation is started in this state, the first drive circuit 61 closes the first control valve 518 and closes the fourth pressure-boosting valve 514. As a result, the wheel cylinder 44 and the second master chamber 21*b* are communicated independently from the pressurization source 54, and the brake feeling is maintained and the hydraulic pressure (master pressure) corresponding to the stroke is applied to the wheel cylinder 44.

Furthermore, the first drive circuit 61 maintains the first pressure-reducing valve 504 and the third pressure-reducing valve 512 in the closed state, maintains the second pressure-boosting valve 506 in the open state, energizes the lead wire 81, and drives the electric motor 541. Thus, the pump 542 is driven, and the brake fluid is supplied from the main flow path 55 to the wheel cylinder 41 through the first pressure-boosting flow path 501, and then supplied to the wheel cylinder 42 through the second pressure-boosting flow path 505 and supplied to the wheel cylinder 43 through the third pressure-boosting flow path 509. That is, the hydraulic pressure of the wheel cylinders 41 to 43 is pressurized by the pressurization source 54. The first drive circuit 61 controls the electric motor 541 based on the stroke and the values of the pressure sensors 94 to 96. The brake fluid is supplied to the wheel cylinder 44 through the second master flow path 519 and the fourth pressure-boosting flow path 513, and the hydraulic pressure pressurized by the pressurization source 54 is generated in the wheel cylinders 41 to 43. Thus, normal braking force (braking force based on pressurization control) is exerted on the front wheels Wfr and Wfl and the left rear wheel Wrl, and braking force based on the master pressure is exerted on the right rear wheel Wrr.

On the other hand, when the brake operation is released from the braking state in a state where the second drive circuit 62 is abnormal, the first drive circuit 61 opens the first pressure-reducing valve 504 and the third pressure-reducing valve 512, opens the second control valve 520 and stops the energization to the electric motor 541. The pump 542 is thereby stopped, so that the brake fluid in the wheel cylinder 41 flows out to the reservoir 24 through the first pressure-reducing flow path 503, and the brake fluid in the wheel cylinder 43 flows out to the reservoir 24 through the third pressure-reducing flow path 511. Furthermore, the brake fluid in the wheel cylinder 42 flows out to the reservoir 24 through the second pressure-boosting flow path 505, the first pressure-boosting flow path 501, and the first pressure-reducing flow path 503. In addition, the brake fluid in the wheel cylinder 44 flows out to the reservoir 24 through the fourth pressure-boosting flow path 513, the fourth pressure-reducing flow path 515, the second master flow path 519, and the second master chamber 21*b*. The hydraulic pressure of the wheel cylinders 41 to 44 thus can be reduced. The wheel cylinder 44 and the reservoir 24 are also communicated through the fourth pressure-boosting flow path 513, the third pressure-boosting flow path 509, and the third pressure-reducing flow path 511.

As described above, according to the first embodiment, even when an abnormality occurs in any one of the first drive circuit 61 and the second drive circuit 62, the three wheels W can exert the same braking force as that in the normal state, and one wheel W can exert the braking force based on the master pressure. According to the first embodiment, the drive circuit merely needs to be mainly increased without doubling the coils of the power supply device and the electromagnetic valve, and thus increase in the number of parts as well as increase in size and cost associated therewith can be suppressed. That is, according to the first embodiment, the failsafe performance at the time of abnormality can be improved while suppressing an increase in the number of parts. According to the first embodiment, for example, an existing structure can be used as a component of the actuator 5.

The vehicle braking device 1 according to the first embodiment includes a first system configured to be able to connect the first master chamber 21a and the wheel cylinders 41 and 42, a second system configured to be able to connect the second master chamber 21b and the wheel cylinders 43 and 44, a main flow path 55 common to the two systems, and a single pump 542 for discharging the brake fluid to the main flow path 55. The first system and the second system are partitioned by check valves 521 and 522. Furthermore, the pump 542 is configured to be controllable from each of the first drive circuit 61 and the second drive circuit 62. According to the present configuration, one common pressurization device (here, pump 542) merely needs to be provided, and an increase in the number of parts is suppressed.

In the first embodiment, the piping configuration is the X piping, and the first control valve 518 and the second control valve 520 are connected to the wheel cylinders 41 and 44 corresponding to the rear wheels Wrl and Wrr, respectively. Thus, at the time of abnormality, the braking force of one of the rear wheels Wrl and Wrr becomes the braking force based on the master pressure, but the braking forces of the other wheels W including at least the front wheels Wfr and Wfl are generated by the wheel pressure based on the pressurization of the pressurization source 54. Therefore, the influence of abnormality on the braking force of the whole vehicle can be suppressed to a minimum.

Second Embodiment

A vehicle braking device 10 according to a second embodiment is different from the first embodiment mainly in that a third control valve and a fourth control valve are provided. Therefore, different portions will be explained. In the description of the second embodiment, the description and the drawings of the first embodiment can be referred to.

Figure 4:
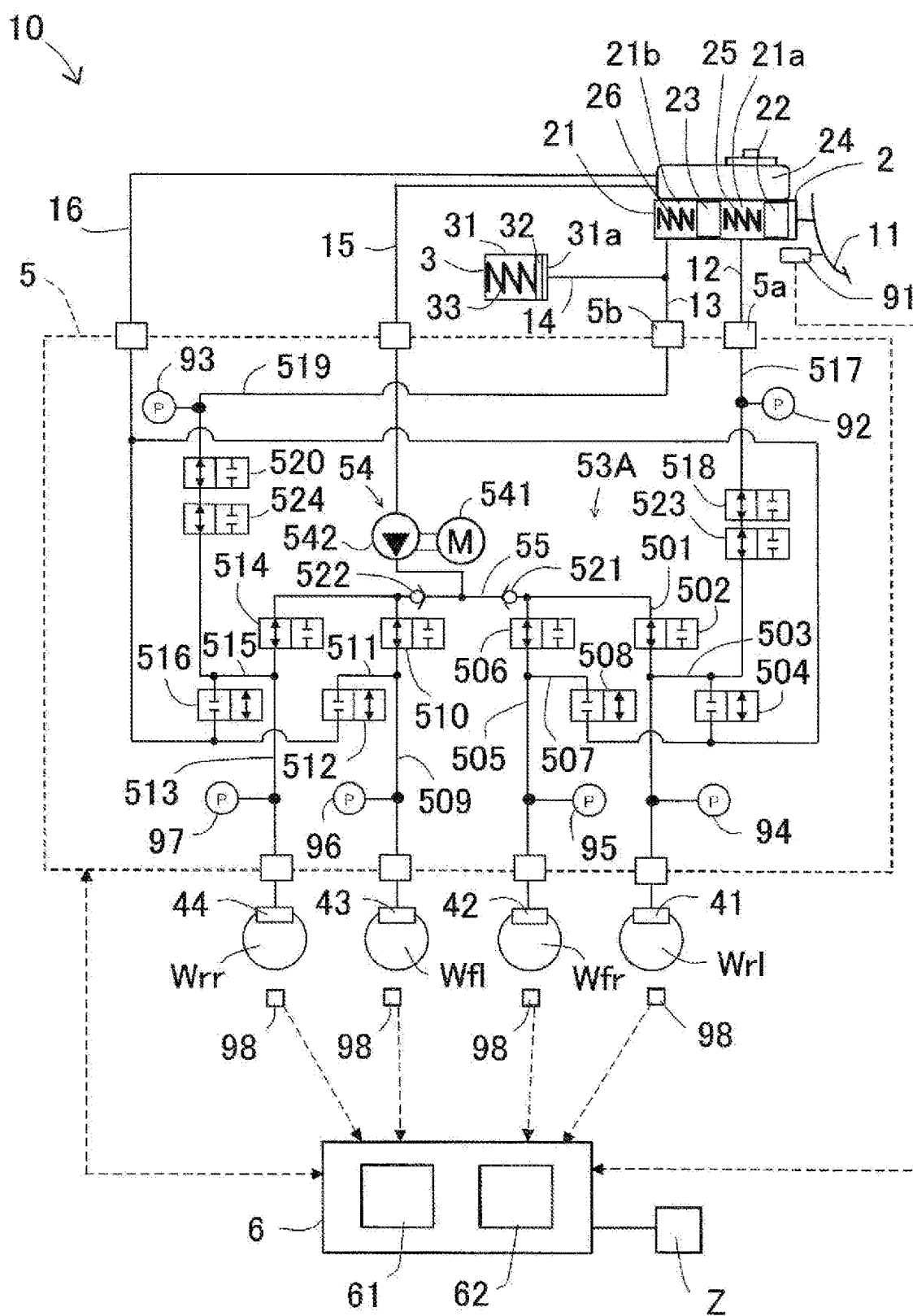
FIG. 4 is a configuration view showing a vehicle braking device according to a second embodiment.

A hydraulic circuit 53A of the second embodiment further includes a third control valve 523 and a fourth control valve 524 in addition to the configuration of the hydraulic circuit 53 of the first embodiment, as shown in FIG. 4. The third control valve 523 is an electromagnetic valve (normally open type electromagnetic valve) which is disposed in the first master flow path 517 in series with the first control valve 518 and which opens in a non-energized state. The third control valve 523 can be said as being connected in series to the first control valve 518. The third control valve 523 is located upstream or downstream (here, downstream) of the first control valve 518 in the first master flow path 517.

The third control valve 523 of the second embodiment is disposed between the first control valve 518 and the first wheel cylinder 41.

The fourth control valve 524 is an electromagnetic valve (normally open type electromagnetic valve) which is disposed in the second master flow path 519 in series with the second control valve 520 and which opens in a non-energized state. The fourth control valve 524 can be said as being connected in series to the second control valve 520. The fourth control valve 524 is located upstream or downstream (here, downstream) of the second control valve 520 in the second master flow path 519. The fourth control valve 524 of the second embodiment is disposed between the second control valve 520 and the fourth wheel cylinder 44.

The first drive circuit 61 of the second embodiment further controls a fourth control valve 524 in addition to the control target of the first embodiment. The second drive circuit 62 of the second embodiment further controls the third control valve 523 in addition to the control target of the first embodiment.

According to the second embodiment, the blocking of the first master flow path 517 is realized when at least one of the closing of the first control valve 518 by the first drive circuit 61 and the closing of the third control valve 523 by the second drive circuit 62 is executed. Similarly, the blocking of the second master flow path 519 is realized when at least one of the closing of the fourth control valve 524 by the first drive circuit 61 and the closing of the second control valve 520 by the second drive circuit 62 is executed. That is, even if one of the first drive circuit 61 and the second drive circuit 62 becomes abnormal (malfunctions), the other drive circuit that is normal controls the control valve so that the first master flow path 517 and the second master flow path 519 can be blocked.

For example, when the first drive circuit 61 is abnormal and the second drive circuit 62 is normal, when the brake operation is started, the second drive circuit 62 closes the second control valve 520, and further closes the third control valve 523. Thus, the first master flow path 517 and the second master flow path 519 are blocked, as in the case of normal brake control. Furthermore, the second drive circuit 62 maintains the second pressure-reducing valve 508 and the fourth pressure-reducing valve 516 in the closed state, maintains the first pressure-boosting valve 502 and the third pressure-boosting valve 510 in the open state, and energizes the lead wire 82 to drive the electric motor 541. Thus, the pump 542 is driven, the brake fluid is supplied from the main flow path 55 to the wheel cylinder 41 through the first pressure-boosting flow path 501, and then supplied to the wheel cylinder 42 through the second pressure-boosting flow path 505, supplied to the wheel cylinder 43 through the third pressure-boosting flow path 509, and then supplied to the wheel cylinder 44 through the fourth pressure-boosting flow path 513. That is, the hydraulic pressure of all the wheel cylinders 41 to 44 is pressurized by the pressurization source 54.

Then, when the brake operation is released from the braking state, the second drive circuit 62 opens the second pressure-reducing valve 508 and the fourth pressure-reducing valve 516, and stops the energization of the electric motor 541. The brake fluid in each of the wheel cylinders 41 to 44 thus flows out to the reservoir 24 as in the first embodiment. At this time, the second drive circuit 62 opens the second control valve 520 and the third control valve 523.

When the second drive circuit 62 is abnormal and the first drive circuit 61 is normal, when the brake operation is started, the first drive circuit 61 closes the first control valve 518, and further closes the fourth control valve 524. Thus, the first master flow path 517 and the second master flow path 519 are blocked, as in the case of normal brake control. Furthermore, the first drive circuit 61 maintains the first pressure-reducing valve 504 and the third pressure-reducing valve 512 in the closed state, maintains the second pressure-boosting valve 506 and the fourth pressure-boosting valve 514 in the open state, and energizes the lead wire 81 to drive the electric motor 541. Thus, the pump 542 is driven, and the brake fluid is supplied from the main flow path 55 to each of the wheel cylinders 41 to 44 through the corresponding pressure-boosting flow paths 501 to 504, respectively. That is, the hydraulic pressure of all the wheel cylinders 41 to 44 is pressurized by the pressurization source 54.

Then, when the brake operation is released from the braking state, the first drive circuit 61 opens the first pressure-reducing valve 504 and the third pressure-reducing valve 512, and stops the energization of the electric motor 541. The brake fluid in each of the wheel cylinders 41 to 44 thus flows out to the reservoir 24 as in the first embodiment. At this time, the first drive circuit 61 opens the first control valve 518 and the fourth control valve 524.

As described above, according to the second embodiment, two electromagnetic valves are merely added to the first embodiment, and even if one drive circuit is abnormal, the normal braking force (braking force based on pressurization control) is exerted at all the wheels W. That is, according to the second embodiment, the failsafe performance at the time of abnormality can be further improved while suppressing an increase in the number of parts.

Third Embodiment

A vehicle braking device according to a third embodiment is different from the first embodiment in the connection configuration between the first control valve 518 and the second control valve 520 and the first drive circuit 61 and the second drive circuit 62. Therefore, different portions will be explained. In the description of the third embodiment, the description and the drawings of the first embodiment can be referred to.

Figure 5:
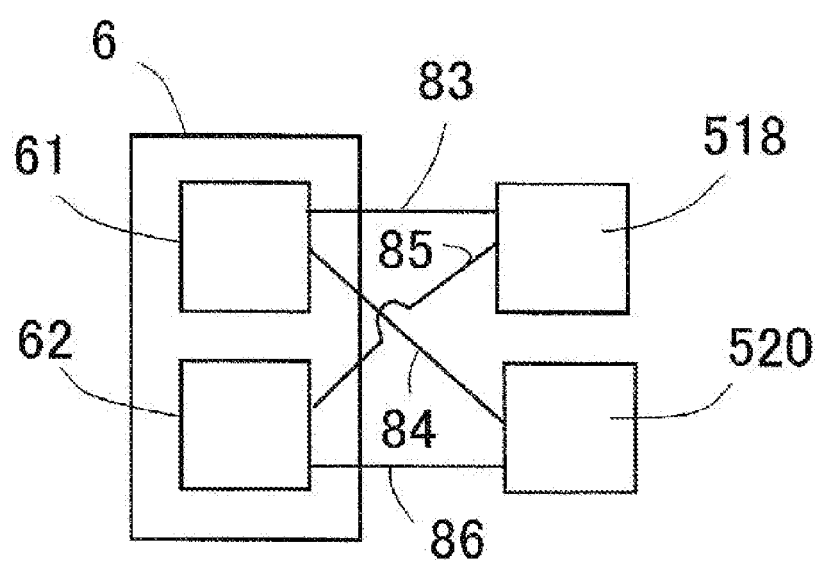
FIG. 5 is a configuration view showing a brake ECU according to a third embodiment.

As shown in FIG. 5, the first control valve 518 and the second control valve 520 of the third embodiment are connected to the first drive circuit 61 and the second drive circuit 62 so as to be controlled independently by the first drive circuit 61 and the second drive circuit 62 respectively. The first drive circuit 61 is connected to the first control valve 518 through a lead wire 83 and is connected to the second control valve 520 through a lead wire 84. The second drive circuit 62 is connected to the first control valve 518 through a lead wire 85 and is connected to the second control valve 520 through a lead wire 86. That is, the first control valve 518 and the second control valve 520 are configured such that they can be controlled from either one of the first drive circuit 61 and the second drive circuit 62 similar to the electric motor 541.

According to the third embodiment, even if one drive circuit becomes abnormal, the other drive circuit that is normal can control both the first control valve 518 and the second control valve 520. Thus, when the brake operation is started, the other drive circuit that is normal closes both the first control valve 518 and the second control valve 520, so that the hydraulic pressure in all the wheel cylinders 41 to 44 is pressurized by the pressurization source 54, similar to the second embodiment. Thus, effects similar to the second embodiment can be obtained by doubling only the wiring of the first control valve 518 and the second control valve 520 with respect to the first embodiment.

Fourth Embodiment

A vehicle braking device 10A according to a fourth embodiment is different from the second embodiment mainly in that a monitoring unit is provided and in the arrangement of the wheels W. Therefore, parts different from the second embodiment will be described. In the description of the fourth embodiment, the descriptions and the drawings of the first and second embodiments can be referred to.

Figure 6:
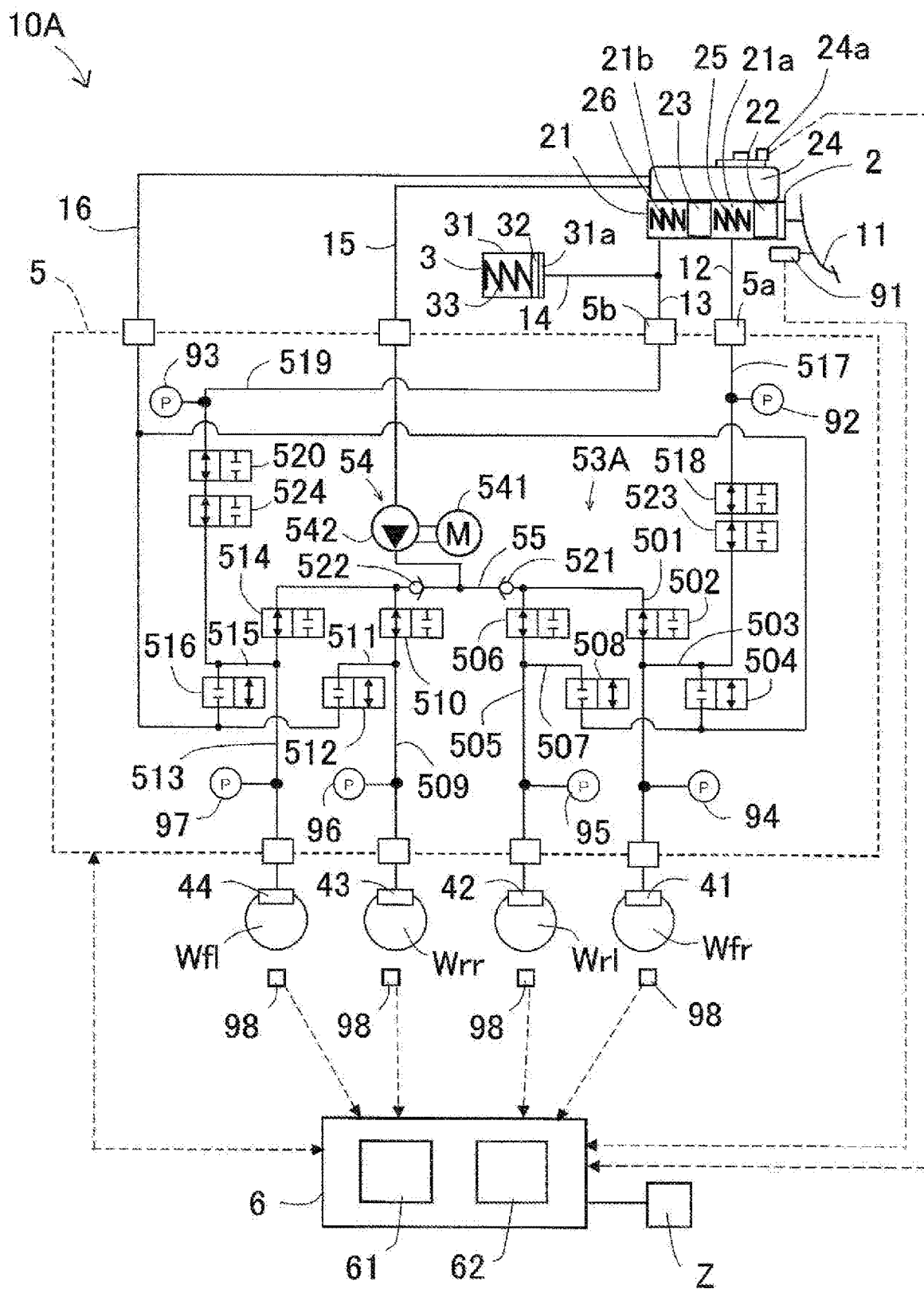
FIG. 6 is a configuration view showing a vehicle braking device according to a fourth embodiment.

As shown in FIG. 6, in the fourth embodiment, the wheel cylinder 41 is disposed on the right front wheel Wfr, the wheel cylinder 42 is disposed on the left rear wheel Wrl, the wheel cylinder 43 is disposed on the right rear wheel Wrr, and the wheel cylinder 44 is disposed on the left front wheel Wfl. That is, the wheel cylinder 41 connected to the first master flow path 517 and the wheel cylinder 44 connected to the second master flow path 519 are disposed on the front wheels Wfr and Wfl.

Furthermore, the vehicle braking device 10A includes a monitoring unit 24a that monitors the amount of brake fluid stored in the reservoir 24. The monitoring unit 24a is, for example, a liquid level switch (reservoir level switch), and is attached to the reservoir 24. The level switch is a device that switches the signal (ON/OFF) to be transmitted, for example, between when the liquid level in the reservoir 24 is a predetermined height or above (liquid amount is a predetermined amount or more) and when the liquid level is less than the predetermined height.

The monitoring unit 24a is connected to the brake ECU 6 through a wiring, and transmits monitoring information to the brake ECU 6. The monitoring unit 24a of the present embodiment is configured to transmit an ON signal to the brake ECU 6 when the amount of liquid in the reservoir 24 is less than a predetermined amount, and not to transmit an ON signal (transmit OFF signal) to the brake ECU 6 when the amount of liquid in the reservoir 24 is greater than or equal to a predetermined amount. The predetermined amount may be set to, for example, the minimum value of the normal use range (see FIG. 7) of the amount of liquid set in the reservoir 24. The monitoring unit 24a may be configured to transmit the ON signal only when the liquid amount is greater than or equal to a predetermined amount.

The first drive circuit 61 of the brake ECU 6 maintains the first control valve 518 and the fourth control valve 524 in the open state, and closes the fourth pressure-boosting valve 514 when the monitoring unit 24a detects that the amount of brake fluid is less than the predetermined amount, that is, when an ON signal is received from the monitoring unit 24a in the fourth embodiment. Similarly, the second drive circuit 62 maintains the second control valve 520 and the third control valve 523 in the open state, and closes the first pressure-boosting valve 502 when the monitoring unit 24a detects that the amount of brake fluid is less than the predetermined amount. That is, the first drive circuit 61 and the second drive circuit 62 closes the first pressure-boosting valve 502 and the fourth pressure-boosting valve 514 without blocking the first master flow path 517 and the second master flow path 519 when the monitoring unit 24a detects that the amount of the brake fluid is less than the predetermined amount. In other words, in this case, the brake ECU 6 communicates the master cylinder 21 and the wheel cylinder 41 through the first master flow path 517, communicates the master cylinder 21 and the wheel cylinder 44 through the second master flow path 519, and closes the first pressure-boosting valve 502 and the fourth pressure-boosting valve 514.

When the brake operation is started, regardless of the volume of the amount of brake fluid in the reservoir 24, the first and second master pistons 22 and 23 move forward, the first and second master chambers 21a and 21b and the reservoir 24 are blocked, and the master pressure is generated in the first and second master chambers 21a and 21b. As described above, the master cylinder 21 is configured such that the first and second master chambers 21a and 21b are blocked from the reservoir 24 when the first and second master pistons 22 and 23 move forward from the initial position by a predetermined distance or more.

According to the fourth embodiment, if the brake operation is started when the monitoring unit 24a detects that the amount of brake fluid is less than the predetermined amount, the master pressure generated in the first master chamber 21a is supplied to the wheel cylinder 41 through the first master flow path 517, and the master pressure generated in the second master chamber 21b is supplied to the wheel cylinder 44 through the second master flow path 519. Furthermore, since the first pressure-boosting valve 502 is in the closed state, the first pressure-boosting flow path 501 is blocked, and the wheel cylinder 41 is not subjected to pressurization by the pressurization source 54. Similarly, since the fourth pressure-boosting valve 514 is in the closed state, the fourth pressure-boosting flow path 513 is blocked, and the wheel cylinder 44 is not subjected to pressurization by the pressurization source 54.

On the other hand, other electromagnetic valves are controlled as usual. That is, the second pressure-boosting valve 506 and the third pressure-boosting valve 510 are maintained in the open state, and the pressure-reducing valves 504, 508, 512, 516 are maintained in the closed state. As a result, when the cause of the decrease in liquid amount is not an external leakage failure but it is a simple decrease in liquid amount (e.g., when maintenance is not performed for a long time), the braking force based on the master pressure (braking force based on depressing force) is generated on the front wheels Wfr and Wfl and the braking force based on the hydraulic pressure pressurization controlled by the pressurization source 54 is generated on the rear wheels Wrr, Wrl. The external leakage failure is a failure in which the brake fluid leaks to the outside, for example, due to a broken pipe or the like.

Here, according to the fourth embodiment, for example, when the cause of decrease in liquid amount is an external leakage failure on one front wheel Wfr (Wfl) side, the braking force is not generated on one front wheel Wfr (Wfl), but a braking force based on the master pressure is generated on the other front wheel Wfl (Wfr), and a normal braking force (a braking force based on pressurization control) is generated on the rear wheels Wrr and Wrl. Furthermore, for example, when the cause of decrease in liquid amount is an external leakage failure on one rear wheel Wrr, Wrl side, braking force is not generated on the rear wheels Wrr, Wrl, but the braking force based on the master pressure is generated on the front wheels Wfr, Wfl. Furthermore, for example, even if the cause of decrease in liquid amount is an external leakage failure of the flow path 15 or the main flow path 55 (i.e., suction flow path or discharge flow path of the pump 542), the braking force is not generated on the rear wheels Wrr and Wrl but the braking force based on the master pressure is generated on the front wheels Wfr and Wfl. The pressurization control by the pressurization source 54 cannot be performed without the supply of the brake fluid from the reservoir 24. On the other hand, the master pressure increases in response to the brake operation without the supply of the brake fluid from the reservoir 24.

Thus, according to the fourth embodiment, even when the amount of brake fluid in the reservoir 24 decreases, the braking force based on the master pressure at one of the front wheels Wfr and Wfl and the normal braking force at both rear wheels Wrr, Wrl or the braking force based on the master pressure at both front wheels Wfr, Wfl can be generated as the braking force of the entire vehicle regardless of the cause of decrease in liquid amount. The front wheels Wfr and Wfl have a higher braking ability than the rear wheels Wrr and Wrl. That is, according to the arrangement configuration of the wheel W, higher braking force can be secured, and necessary braking force can be exhibited. According to the fourth embodiment, even when an abnormality (electrical failure) occurs in one drive circuit, the normal braking force can be exerted by all the wheels W as in the second and third embodiments, and even when an external leakage failure occurs instead of an electrical failure, the braking force can be secured.

Figure 7:
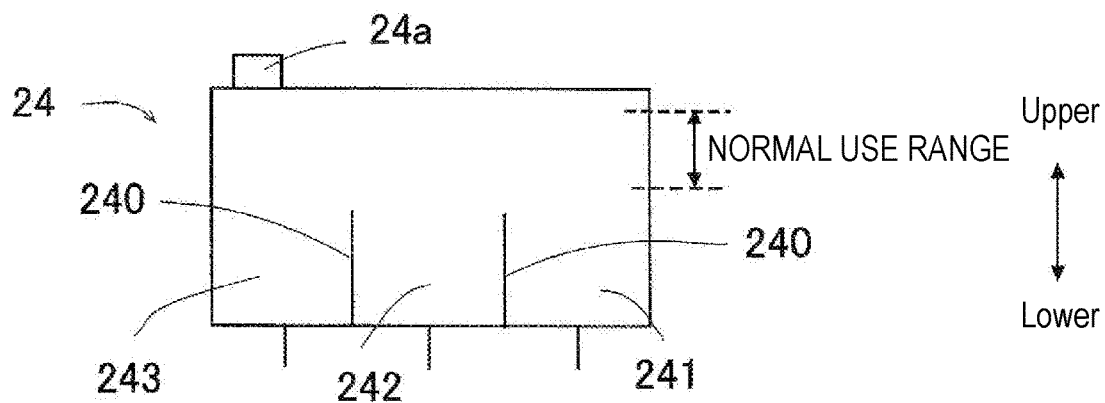
FIG. 7 is a configuration view showing a reservoir according to the fourth embodiment.

The vehicle braking device 10A is configured to notify, when the monitoring unit 24a detects that the amount of brake fluid is less than a predetermined amount, the driver of such a fact by lighting a warning lamp or the like. Furthermore, as shown in FIG. 7, in the reservoir 24 of the fourth embodiment, a partition wall 240 is arranged to partition the inside of the reservoir 24 into a first chamber 241 connected to the first master chamber 21a, a second chamber 242 connected to the second master chamber 21b, and a third chamber 243 connected to the pump 542 (the flow path 15). The partition wall 240 is formed such that the position of the upper end is lower than the liquid level (which may be referred to as the minimum required liquid level) corresponding to the minimum value of the normal use range of the brake fluid. The liquid amount is monitored by the monitoring unit 24a common to the respective chambers 241 to 243 by setting the predetermined amount so that the liquid level corresponding to the predetermined amount becomes higher than the upper end of the partition wall 240. Furthermore, as the inside of the reservoir 24 is partitioned, the brake fluid is stored independently in each of the chambers 241 to 243 after the liquid level becomes lower than the upper end of the partition wall 240, and thus the effect of the external leakage failure can be suppressed to a minimum.

Moreover, the monitoring unit 24a is not limited to the above, and may be, for example, a device that detects the value of the liquid amount, in which case, the brake ECU 6 may be configured to determine whether the value of the liquid amount acquired from the monitoring unit 24a is less than a predetermined amount.

Fifth Embodiment

The vehicle braking device 100 according to a fifth embodiment is different from the first embodiment in that a cut valve 34 is provided with respect to the stroke simulator 3. Therefore, parts different from the first embodiment will be described. In the description of the fifth embodiment, the description and the drawings of the first embodiment can be referred to.

Figure 8:
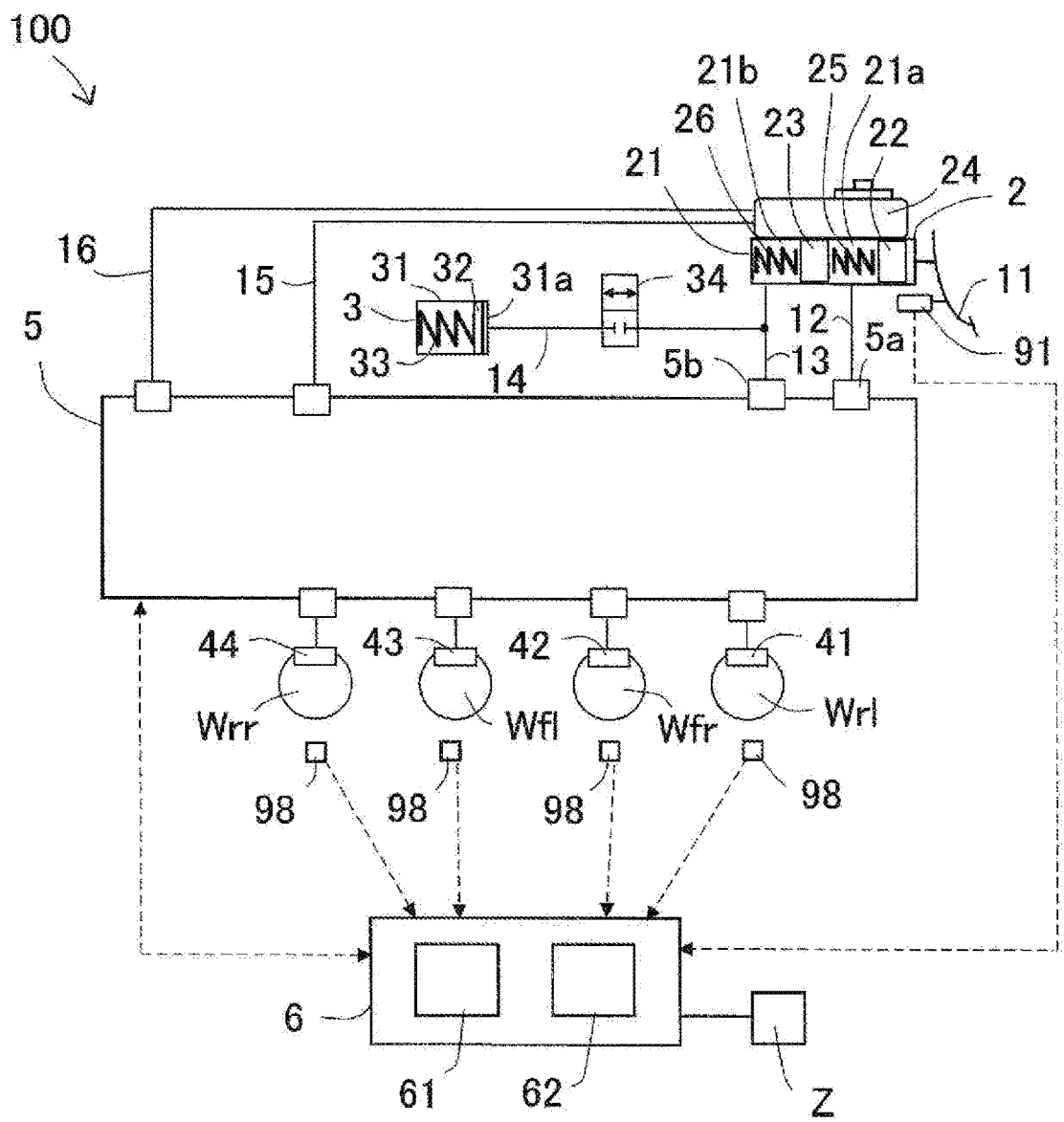
FIG. 8 is a configuration view showing a vehicle braking device according to a fifth embodiment.

As shown in FIG. 8, the vehicle braking device 100 includes the cut valve 34 in addition to the configuration of the first embodiment. The cut valve 34 is an electromagnetic valve disposed in the flow path 14 connecting the master cylinder 21 and the stroke simulator 3 and is a normally closed type electromagnetic valve that closes in a non-energized state. The cut valve 34 is connected to the brake ECU 6 and is controlled by one drive circuit, here the first drive circuit 61. In FIG. 8, the wiring connecting the cut valve 34 and the brake ECU 6 is omitted.

According to the fifth embodiment, the brake feeling by the stroke simulator 3 can be exhibited by opening the cut valve 34, and the brake fluid can be sent out toward the downstream side without being flowed into the stroke simulator 3 at the time of the brake operation by closing the cut valve 34. For example, when the master pressure is supplied to the wheel cylinders 41 and 44, the wheel pressure can be increased without loss of the brake fluid by closing the cut valve 34. Since the cut valve 34 is a normally closed type electromagnetic valve, when one drive circuit becomes abnormal, the brake ECU 6 maintains the cut valve 34 in the closed state so that the braking force based on the master pressure can be increased without loss. In addition, the brake feeling can be made by opening and closing the cut valve 34.

Figure 9:
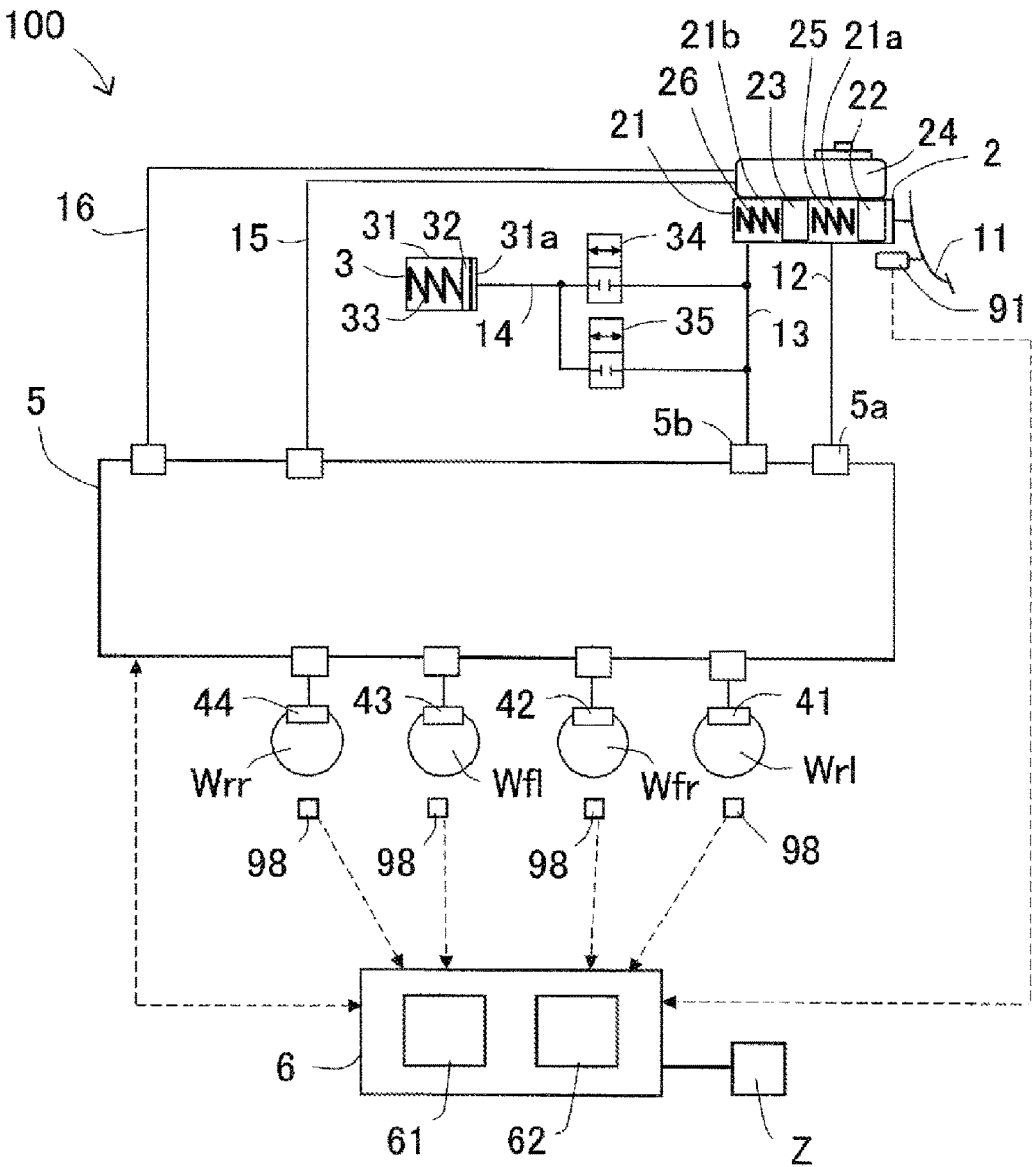
FIG. 9 is a configuration view showing a modified mode of the vehicle braking device according to the fifth embodiment.

Furthermore, the configuration including the cut valve 34 can be applied to the second to fourth embodiments. In this case as well, the brake ECU 6 can select whether to prioritize the brake feeling or to prioritize the increase in wheel pressure by opening and closing the cut valve 34 according to the situation. Furthermore, as shown in FIG. 9, in the fifth embodiment or the configuration in which the cut valve 34 is applied to the second to fourth embodiments, a second cut valve 35 may be disposed in parallel to the cut valve 34. In this case, for example, the first drive circuit 61 controls the cut valve 34, and the second drive circuit 62 controls the second cut valve 35. In FIG. 9 as well, the communication line connecting the cut valves 34 and 35 and the brake ECU 6 is omitted.

With this configuration, even when one drive circuit becomes abnormal, the master cylinder 21 and the stroke simulator 3 can be communicated, and a brake feeling can be secured. In the configuration of FIG. 8, the cut valve 34 may be connected to the first drive circuit 61 and the second drive circuit 62 so as to be independently controllable by the first drive circuit 61 and the second drive circuit 62, similarly to the electric motor 541. Effect similar to the configuration of FIG. 9 thus can be exhibited.

Others

Figure 10:
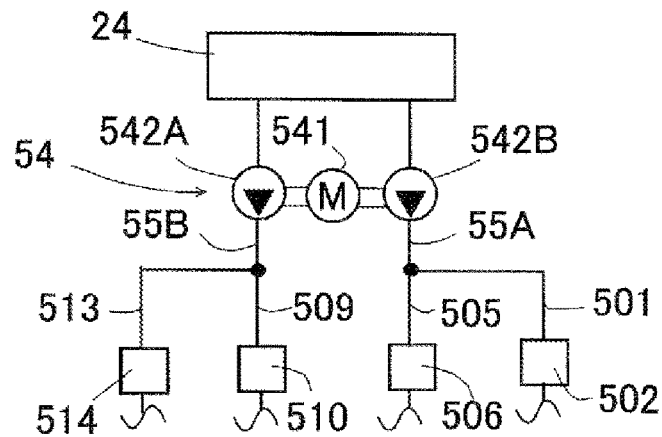
FIG. 10 is a configuration view showing a part of a modified mode of the vehicle braking device according to the first embodiment.

The present invention is not limited to the embodiments described above. For example, the main flow path 55 may be provided independently for each system, and for example, as shown in FIG. 10, the first main flow path 55A may be provided in the system on the wheel cylinders 41 and 42 side and the second main flow path 55B may be provided in the system on the wheel cylinders 43 and 44 side. In this case, the pressurization source 54 may include a pump 542A connected to the first main flow path 55A, a pump 542B connected to the second main flow path 55B, and a common electric motor 541. Even in this configuration, similar effect as described above are exhibited except that the number of pressurization devices is two. The hydraulic circuit 53 of the first embodiment is divided into two systems by the check valves 521 and 522, and the main flow path 55 can be said to be a discharge flow path common to the two systems. In the present invention, the second main flow path 55B may be configured as a flow path common to the first main flow path 55A, or may be configured as a flow path independent of the first main flow path 55A.

In addition, the piping configuration may be front and rear piping. However, from the standpoint of reliably ensuring the braking forces of the front wheels Wfr and Wfl to improve the balance of the braking forces of the entire vehicle, it is preferable to use the X piping as described above. Furthermore, the pressure-boosting flow paths 501, 505, 509, and 513 and the corresponding wheel cylinders 41 to 44 can be cut, and for example, can be cut by installing a lid member in the flow paths. Therefore, for example, in the configuration of the first embodiment, the selected wheel W (e.g., only rear wheels Wrr and Wrl) may be separated from the hydraulic circuit 53, and the separated wheel W may be caused to exert a braking force by a separate braking device.

Moreover, similar effects as described above can be exhibited even with a hydraulic circuit having only one system two channels. For example, describing a case where the hydraulic circuit 53 includes only the system on the wheel cylinders 41 and 42 by way of example, the second drive circuit 62 closes the first pressure-boosting valve 502 at the time of pressure boost when abnormality has occurred in the first drive circuit 61. Thus, the master pressure is supplied to the wheel cylinder 41, and the hydraulic pressure pressurized by the pressurization source 54 is supplied to the wheel cylinder 42. On the other hand, when an abnormality has occurred in the second drive circuit 62, the first drive circuit 61 closes the first control valve 518 at the time of pressure boost. Thus, the hydraulic pressure of the wheel cylinders 41 and 42 is pressurized by the pressurization source 54 similar to the normal time. At the time of pressure reduction, even if one of the drive circuits 61 and 62 is abnormal, the first pressure-reducing valve 504 or the second pressure-reducing valve 508 can be opened by the other drive circuit 61 and 62. Thus, the brake fluid in the wheel cylinders 41 and 42 can be flowed out to the reservoir 24. That is, high failsafe performance is exhibited while suppressing an increase in the number of parts.

Furthermore, a case where the master cylinder 21, the first master flow path 517, and the first control valve 518 are not provided in the one-system two-channel vehicle braking device as described above will be described. In this case, when one of the drive circuits 61 and 62 is abnormal, both the first pressure-boosting valve 502 and the second pressure-boosting valve 506 can be opened at the time of pressure boost, and hence pressurization with the pressurization source 54 is possible on the wheel cylinders 41, 42, similar to the normal time.

In addition, at the time of pressure reduction, even if one of the drive circuits 61 and 62 is abnormal, the first pressure-reducing valve 504 or the second pressure-reducing valve 508 can be opened by the other drive circuits 61 and 62. Thus, the brake fluid in the wheel cylinders 41 and 42 can be flowed out to the reservoir 24. For example, when only the first pressure-reducing valve 504 is opened, the brake fluid in the wheel cylinder 41 flows out to the reservoir 24 through the first pressure-reducing flow path 503, and the brake fluid in the wheel cylinder 42 flows out to the reservoir 24 through the second pressure-boosting flow path 505, the main flow path 55, the first pressure-boosting flow path 501, and the first pressure-reducing flow path 503. Similarly, when only the second pressure-reducing valve 508 is opened, the brake fluid in the wheel cylinder 41 flows out to the reservoir 24 through the first pressure-boosting flow path 501, the main flow path 55, the second pressure-boosting flow path 505, and the second pressure-reducing flow path 507, and the brake fluid in the wheel cylinder 42 flows out to the reservoir 24 through the second pressure-reducing flow path 507. If the wheel pressure cannot be reduced, it is difficult to move the vehicle, which is not preferable from the viewpoint of failsafe. However, according to the present configuration, the wheel pressure can be reduced more reliably, and high fail-safe performance is exhibited.

Furthermore, the pressurization source 54 may include, as a pressurization device driven by the electric motor 541, a pressurization device of a type which linearly moves a piston in a cylinder instead of the pump 542. Moreover, the brake ECU 6 or another ECU may include a third drive circuit that controls the pressurization source 54. In addition, the brake ECU 6 may include a notification unit that notifies the driver and the normal drive circuits 61 and 62 of an abnormality in the drive circuits 61 and 62. One or more power supplies Z may be provided. Furthermore, one master piston may be provided. The various switching elements may be bipolar transistors, in which case, the gate corresponds to the base, the drain to the collector, and the source to the emitter. The present invention is also suitable for automatic operation. Furthermore, the "flow path" in the above description can be reworded to a pipe line, a piping, a hydraulic pressure path or the like. Moreover, various pressures (wheel pressure and master pressure) can also be estimated from the stroke. In addition, the vehicle braking device 1 may include two ECUs having a drive circuit. The reservoir may be in plurals.

The invention claimed is:

1. A vehicle braking device comprising:
a pressurization source that ejects a brake fluid to a first main flow path;
a reservoir that stores the brake fluid;
a hydraulic circuit connected to the first main flow path; and
a control unit that controls the hydraulic circuit,
wherein
the hydraulic circuit includes:
a first pressure-boosting flow path that connects the first main flow path and a first wheel cylinder;
a first pressure-boosting valve that is disposed in the first pressure-boosting flow path and that opens in a non-energized state;
a first pressure-reducing flow path that connects the first wheel cylinder and the reservoir;
a first pressure-reducing valve that is disposed in the first pressure-reducing flow path and that closes in a non-energized state;
a second pressure-boosting flow path that connects the first main flow path and a second wheel cylinder;
a second pressure-boosting valve that is disposed in the second pressure-boosting flow path and that opens in a non-energized state;
a second pressure-reducing flow path that connects the second wheel cylinder and the reservoir; and
a second pressure-reducing valve that is disposed in the second pressure-reducing flow path and that closes in a non-energized state,
the control unit includes:
a first drive circuit that controls the first pressure-reducing valve; and
a second drive circuit that is a separate drive circuit from the first drive circuit and that controls the second pressure-reducing valve,
a master cylinder in which a hydraulic pressure increases or decreases according to an operation of a brake operation member is further arranged,
the hydraulic circuit further includes:
a first master flow path that connects the first wheel cylinder and the master cylinder; and
a first control valve that is disposed in the first master flow path and that opens in a non-energized state,
the first drive circuit further controls the second pressure-boosting valve and the first control valve, and
the second drive circuit further controls the first pressure-boosting valve.

2. The vehicle braking device according to claim 1, wherein
the pressurization source ejects the brake fluid to a second main flow path configured as a flow path common to the first main flow path or a second main flow path configured as a flow path independent of the first main flow path,
the hydraulic circuit includes:
a third pressure-boosting flow path that connects the second main flow path and a third wheel cylinder;
a third pressure-boosting valve that is disposed in the third pressure-boosting flow path and that opens in a non-energized state;
a third pressure-reducing flow path that connects the third wheel cylinder and the reservoir;
a third pressure-reducing valve that is disposed in the third pressure-reducing flow path and that closes in a non-energized state;
a fourth pressure-boosting flow path that connects the second main flow path and a fourth wheel cylinder;
a fourth pressure-boosting valve that is disposed in the fourth pressure-boosting flow path and that opens in a non-energized state;
a fourth pressure-reducing flow path that connects the fourth wheel cylinder and the reservoir;
a fourth pressure-reducing valve that is disposed in the fourth pressure-reducing flow path and that closes in a non-energized state;
a second master flow path that connects the fourth wheel cylinder and the master cylinder; and
a second control valve that is disposed in the second master flow path and that opens in a non-energized state,
the first drive circuit further controls the fourth pressure-boosting valve and the third pressure-reducing valve, and
the second drive circuit further controls the third pressure-boosting valve, the fourth pressure-reducing valve, and the second control valve.

3. The vehicle braking device according to claim 2, wherein
the hydraulic circuit further includes:
a third control valve that is disposed in the first master flow path in series with the first control valve and that opens in a non-energized state; and
a fourth control valve that is disposed in the second master flow path in series with the second control valve and that opens in a non-energized state,
the first drive circuit further controls the fourth control valve, and
the second drive circuit further controls the third control valve.

4. The vehicle braking device according to claim 3, further comprising a monitoring unit that monitors the amount of brake fluid stored in the reservoir,
wherein
the first wheel cylinder is installed on the right front wheel,
the second wheel cylinder is disposed on the left rear wheel, the third wheel cylinder is disposed on the right rear wheel, the fourth wheel cylinder is disposed on the left front wheel, and when the monitoring unit detects that the amount of brake fluid is less than a predetermined amount, the control unit closes the first pressure-boosting valve and the fourth pressure-boosting valve without blocking the first master flow path and the second master flow path.

5. The vehicle braking device according to claim 2, wherein the first control valve and the second control valve are connected to the first drive circuit and the second drive circuit so as to be independently controllable by the first drive circuit and the second drive circuit, respectively.

6. The vehicle braking device according to claim 5, further comprising a monitoring unit that monitors the amount of brake fluid stored in the reservoir,
wherein
the first wheel cylinder is installed on the right front wheel,
the second wheel cylinder is disposed on the left rear wheel,
the third wheel cylinder is disposed on the right rear wheel,
the fourth wheel cylinder is disposed on the left front wheel, and
when the monitoring unit detects that the amount of brake fluid is less than a predetermined amount, the control unit closes the first pressure-boosting valve and the fourth pressure-boosting valve without blocking the first master flow path and the second master flow path.

7. The vehicle braking device according to claim 2, wherein
the second main flow path is a flow path common to the first main flow path,
the pressurization source includes:
  an electric motor; and
  a single pressurization device driven by the electric motor to eject the brake fluid to the first main flow path,
the first main flow path includes:
  a first check valve disposed in the first main flow path such that the pressurization device, the third pressure-boosting valve, and the fourth pressure-boosting valve are on a first side of the first check valve and the first pressure-boosting valve and the second pressure-boosting valve are on a second side of the first check valve, and configured to permit the flow of the brake fluid from the first side of the first check valve to the second side of the first check valve and to prohibit the flow of the brake fluid from the second side of the first check valve to the first side of the first check valve; and
  a second check valve disposed in the first main flow path such that the pressurization device, the first pressure-boosting valve, and the second pressure-boosting valve are on a first side of the second check valve and the third pressure-boosting valve and the fourth pressure-boosting valve are on a second side of the second check valve, and configured to permit the flow of the brake fluid from the first side of the second check valve to the second side of the second check valve and to prohibit the flow of the brake fluid from the second side of the second check valve to the first side of the second check valve, and the electric motor is connected to the first drive circuit and the second drive circuit so as to be independently controllable by the first drive circuit and the second drive circuit.

8. The vehicle braking device according to claim 7, wherein
the first wheel cylinder is installed on a left rear wheel,
the second wheel cylinder is disposed on a right front wheel,
the third wheel cylinder is disposed on a left front wheel, and
the fourth wheel cylinder is disposed on a right rear wheel.

9. The vehicle braking device according to claim 7, wherein
the hydraulic circuit further includes:
  a third control valve that is disposed in the first master flow path in series with the first control valve and that opens in a non-energized state; and
  a fourth control valve that is disposed in the second master flow path in series with the second control valve and that opens in a non-energized state,
the first drive circuit further controls the fourth control valve, and
the second drive circuit further controls the third control valve.

10. The vehicle braking device according to claim 9, further comprising a monitoring unit that monitors the amount of brake fluid stored in the reservoir,
wherein
the first wheel cylinder is installed on the right front wheel,
the second wheel cylinder is disposed on the left rear wheel,
the third wheel cylinder is disposed on the right rear wheel,
the fourth wheel cylinder is disposed on the left front wheel, and
when the monitoring unit detects that the amount of brake fluid is less than a predetermined amount, the control unit closes the first pressure-boosting valve and the fourth pressure-boosting valve without blocking the first master flow path and the second master flow path.

11. The vehicle braking device according to claim 7, wherein the first control valve and the second control valve are connected to the first drive circuit and the second drive circuit so as to be independently controllable by the first drive circuit and the second drive circuit, respectively.

12. The vehicle braking device according to claim 11, further comprising a monitoring unit that monitors the amount of brake fluid stored in the reservoir,
wherein
the first wheel cylinder is installed on the right front wheel,
the second wheel cylinder is disposed on the left rear wheel,
the third wheel cylinder is disposed on the right rear wheel,
the fourth wheel cylinder is disposed on the left front wheel, and
when the monitoring unit detects that the amount of brake fluid is less than a predetermined amount, the control unit closes the first pressure-boosting valve and the fourth pressure-boosting valve without blocking the first master flow path and the second master flow path.

* * * * *